United States Patent
Elliott, III

(10) Patent No.: US 6,272,115 B1
(45) Date of Patent: Aug. 7, 2001

(54) INTERACTIVE TOLL-FREE TELEPHONE SERVICE AUTOMATION

(75) Inventor: Emmett Marion Elliott, III, Lenexa, KS (US)

(73) Assignee: Sprint Communications Company, L.P., Kansas City, MO (US)

( * ) Notice: Subject to any disclaimer, the term of this patent is extended or adjusted under 35 U.S.C. 154(b) by 0 days.

(21) Appl. No.: 09/014,713

(22) Filed: Jan. 28, 1998

(51) Int. Cl.[7] .......................... H04L 12/16; H04L 12/66; H04M 3/42; H04M 7/00

(52) U.S. Cl. ..................... 370/259; 370/352; 379/201; 379/219

(58) Field of Search .......................... 370/352, 354–356, 370/400, 401, 259, 437; 379/210, 220, 201, 230, 207, 27; 705/32, 34, 26, 1; 345/329

(56) References Cited

U.S. PATENT DOCUMENTS

| 4,611,094 | * | 9/1986 | Asmuth et al. | 379/201 |
|---|---|---|---|---|
| 5,881,131 | * | 3/1999 | Farris et al. | 379/27 |
| 5,945,989 | * | 8/1999 | Freishtat et al. | 345/329 |
| 5,970,477 | * | 10/1999 | Roden | 705/32 |
| 5,999,908 | * | 12/1999 | Abelow | 705/1 |
| 6,058,177 | * | 5/2000 | Newcombe et al. | 379/210 |

\* cited by examiner

Primary Examiner—Hassan Kizou
Assistant Examiner—John Pezzlo
(74) Attorney, Agent, or Firm—Harley R. Ball

(57) ABSTRACT

The present invention provides methods and systems for implementing interactive toll-free telephone services by customers remotely communicating with a telephone service provider. The interactive toll-free telephone service can be designed by the customer and implemented by the telephone service provider without the immediate assistance of a salesperson. The methods/systems can be implemented over, e.g., the Internet, an intranet, or through a voice recognition system using the telephone.

40 Claims, 6 Drawing Sheets

INTERACTIVE TOLL-FREE TELEPHONE SERVICE AUTOMATION

RELATED APPLICATIONS

Not Applicable

FEDERALLY SPONSORED RESEARCH OR DEVELOPMENT

Not Applicable

MICROFICHE APPENDIX

Not Applicable

1. Field of the Invention

The present invention relates to the field of interactive toll-free telephone service. More particularly, the present invention relates to methods and systems for interactive toll-free telephone service automation.

2. Background of the Invention

Interactive toll-free telephone service plays an increasingly important role in business transactions and has resulted in an ever-increasing need for such services by many businesses, individuals, and other entities. Under current practices, the methods and systems for activating a interactive toll-free telephone service require the design of such a service by the potential customer with the assistance of a sales person for a telephone service provider. The design typically involves determining the call flow for the service, i.e., "Press 1 for sales, 2 for service . . . "

Because of the critical role that an interactive toll-free telephone service can play in the ability of a business to retain current customers and attract new customers, interactive telephone services are typically provided in test form first to ensure that calls are accurately routed. One drawback to the current practice is that the time required to contact a sales person, design the service, and implement a test version of the interactive toll-free telephone service can deter potential customers from requesting such services. In some cases, the time required to implement a test interactive toll-free telephone service from the initial call to a sales person is about seven to eleven days.

In addition to the time required to implement a test interactive toll-free telephone service, requests for such services can occupy large amounts of time for a sales force, thereby preventing the sales force from focusing efforts on more productive areas such as trouble shooting or assisting customers with more complex needs.

SUMMARY OF THE INVENTION

The present invention provides methods and systems for implementing interactive toll-free telephone services by customers remotely communicating with a telephone service provider. The interactive toll-free telephone service can be designed by the customer and implemented by the telephone service provider without the immediate assistance of a salesperson.

In one aspect the present invention provides a method for providing interactive toll-free telephone service by providing a service automation system for processing requests for interactive toll-free telephone service; connecting the service automation system to a communication network whereby a request for interactive toll-free telephone service can be communicated to the service automation system by a customer; providing design parameters for designing an interactive toll-free telephone service to the customer, whereby the customer can design an interactive toll-free telephone service; receiving an interactive toll-free telephone service design from the customer through the communication network; and implementing the interactive toll-free telephone service with a call flow based on the interactive toll-free telephone service design from the customer.

In another aspect the present invention provides a method for providing interactive toll-free telephone service by providing a service automation system for processing requests for interactive toll-free telephone service; connecting the service automation system to a communication network whereby a request for interactive toll-free telephone service can be communicated to the service automation system by a customer, wherein the communication network comprises the Internet; providing design parameters for designing an interactive toll-free telephone service to the customer, whereby the customer can design an interactive toll-free telephone service; receiving an interactive toll-free telephone service design from the customer through the communication network; converting the interactive toll-free telephone service design received from the customer into platform scripting logic; communicating the platform scripting logic to a telephone service platform; implementing the interactive toll-free telephone service for a limited period of time with a call flow based on the interactive toll-free telephone service design from the customer; and communicating a telephone number for the interactive toll-free telephone service to the customer.

In another aspect, the present invention provides a system for providing interactive toll-free telephone service including a service automation system for processing requests for interactive toll-free telephone service; means for connecting the service automation system to a communication network whereby a request for interactive toll-free telephone service can be communicated to the service automation system by a customer; means for providing design parameters for designing an interactive toll-free telephone service to the customer, whereby the customer can design an interactive toll-free telephone service; means for receiving an interactive toll-free telephone service design from the customer through the communication network; and means for implementing the interactive toll-free telephone service on a telephone service platform with a call flow based on the interactive toll-free telephone service design from the customer.

These and other features and advantages of the present invention are described in more detail below with reference to the attached figures.

DETAILED DESCRIPTION OF ILLUSTRATIVE EMBODIMENTS OF THE INVENTION

The present invention provides both methods and systems that allow customers to design and implement interactive toll-free telephone service without the assistance or intervention of a salesperson. The customer or potential customer can access the system remotely through a communication network, e.g., through a computer network server or a telephone network including an interactive telephone system, and uses the information provided by the telephone service provider to design the call flow for the interactive toll-free telephone service.

One of the advantages of the present invention is a significant reduction in the time typically required to establish interactive toll-free telephone service. This can be particularly important if the customers have the opportunity to design and implement interactive toll-free telephone service without contacting a salesperson. Other advantages include a significant reduction in the sales time and effort required to assist customers in establishing interactive toll-free telephone services, thereby freeing the sales force to assist customers with more complex products and services.

By removing the need to work directly with a salesperson, the present invention also allows the telephone service provider to quickly and easily implement test toll-free services to a larger group of potential customers. Because one of the barriers to toll-free telephone service access is reduced or removed, the toll-free telephone services may be used by more businesses and individuals.

Figure 1:
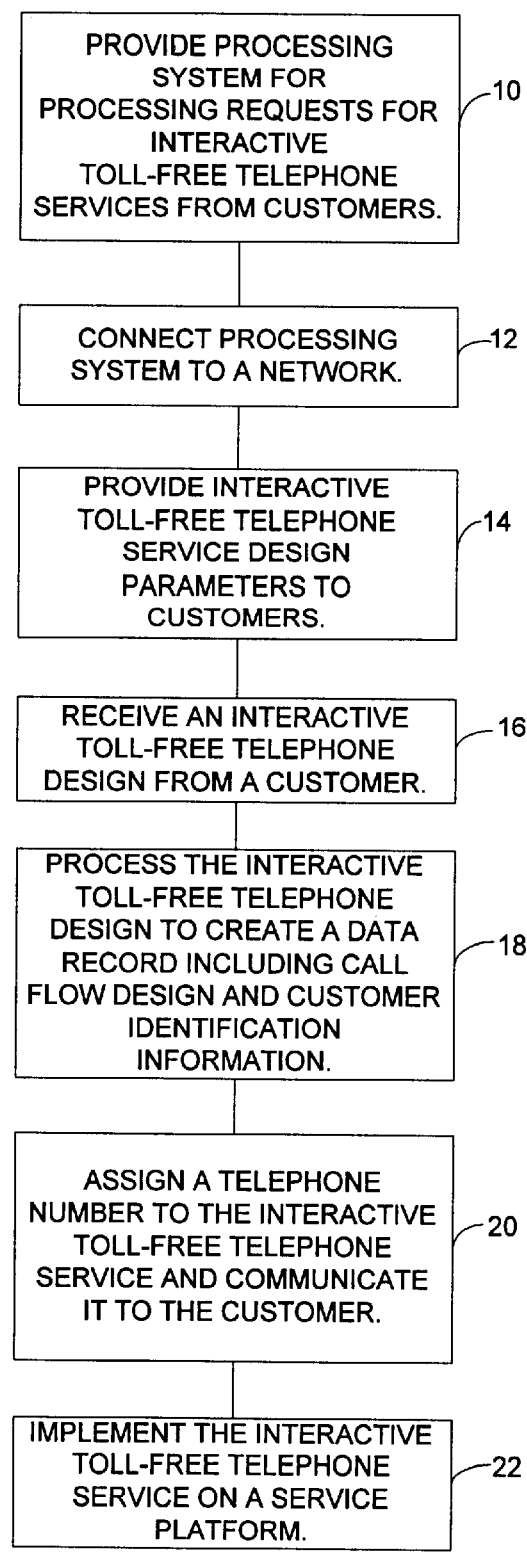
FIG. 1 is a flow diagram of one method for providing interactive toll-free telephone service.

FIG. 1 illustrates one method of providing interactive toll-free telephone services to customers. One step 10 in the method depicted in FIG. 1 includes providing a processing system for receiving and processing requests for toll-free telephone service. The processing system preferably is capable of receiving the requests in, e.g., an object oriented programming language such as HTML or an equivalent.

After the processing system is provided, the method includes the step 12 of connecting the processing system to a communication network through which customers can interactively access the processing system. The network connection can be through an intranet server and/or an Internet server using known connection schemes such as Transaction Control Protocol/Internet Protocol (TCP/IP) interfaces or equivalents. Alternatively, the connection can take place over telephone lines via a direct modem connection with the appropriate communications software.

After the processing system is connected to one or more communication networks to which customers have access, the method involves the step 14 of providing interactive toll-free telephone service design parameters to customers connecting to the processing system through the network. Those design parameters will typically include the structure within which the call flow can be varied as a part of the interactive toll-free telephone service. Examples of call flow include the desired response in the interactive toll-free service to the entry of input by a caller, such as routing the caller to a salesperson in response to an input of "1", routing the caller to a service department in response to an input of "2", routing the caller to a known extension number, etc.

The correct design of the call flow is of critical importance to the customer. In known systems, the call flow design for an interactive toll-free telephone service typically requires collaboration between the customer and a salesperson. In the present invention, however, the customer is provided with the tools to design the call flow for the interactive toll-free telephone service without the immediate assistance of a salesperson. By allowing the customer to design the call-flow, preferably in an object oriented programming language through, e.g., a graphical user interface, the telephone service provider can focus the efforts of its sales force on customers requiring assistance with more complex products and services. In addition, the customer can experiment more in the design of the call flow without the need for assistance of a salesperson.

After the customer has designed the call flow, the next step 16 in the method involves receiving the interactive toll-free telephone service design from the customer in whatever object-oriented programming language used by the customer to design the service. Typically, that call flow design and corresponding customer identification information such as the customer's name, address, telephone number, e-mail address, etc. will be received by the processing system.

After receiving the information generated by the customer, the next step 18 is to process the information to create a data record. A portion of the data record consists of the customer's identification information. Another portion of the data record includes the call flow design sent by the customer. In the depicted method, step 18 includes conversion of the object-oriented language forwarded by the customer into platform scripting logic that can be forwarded to a telephone services platform for actual implementation as a working interactive toll-free telephone service.

The next step 20 in the depicted method includes assigning a telephone number to the interactive toll-free telephone service to be provided and communicating the number back to the customer. In addition to the telephone number, the method may also include providing the customer with additional information, e.g., rates for the service as designed by the customer, contact information for a designated salesperson, etc.

Step 22 in the depicted method involves implementing the interactive toll-free telephone service on a service platform using the platform scripting logic based on the customer's call flow design.

It should be understood that it may be possible to combine the functions of the steps discussed above in other combinations other than those depicted in FIG. 1 and described above. For example, it may be possible to perform some of the functions of the processing system in the network server or vice versa.

Regardless of the actual order of the steps described above and the functions performed in those steps, it should be understood that methods and systems according to the present invention allow customers to access the information required to design an interactive toll-free telephone service, design the call flow for that service, and communicate that design to the telephone service provider in a manner that allows the service provider to implement the interactive toll-free telephone service (with the customer's call flow design)—all without the assistance of a salesperson.

It will typically be preferred that the methods according to the present invention are used primarily for implementing interactive toll-free telephone service on a test or preview basis. In other words, the interactive toll-free telephone service would be implemented for a limited period of time to allow the customer to call the designated telephone number and test the call flow design to ensure that it routed calls in the manner intended by the customer.

In those methods and systems in which the interactive toll-free telephone service is implemented only on a test basis, an additional advantage is provided in that the telephone numbers used for the interactive toll-free telephone services can be reused (preferably after an appropriate out-of-service interval). It would also be preferred that the service platform used to implement the interactive toll-free telephone service include a dedicated trunk group for the test or preview interactive toll-free telephone services.

If the method of the present invention were used for the implementation of test or preview interactive toll-free telephone service, the data record created as a part of the process (preferably including both customer identification information as well as scripting logic) could be retained after the test or preview period has expired for later implementation of the interactive toll-free telephone service on a permanent basis if desired by the customer. The period of time that the data records would be retained could be varied as desired. In addition to retaining the data records for implementation of permanent interactive toll-free telephone service, the data records could also be stored in a manner that allowed the customer to access and resubmit the data record to preview the interactive toll-free telephone service one or more times after the initial preview.

Figure 2:
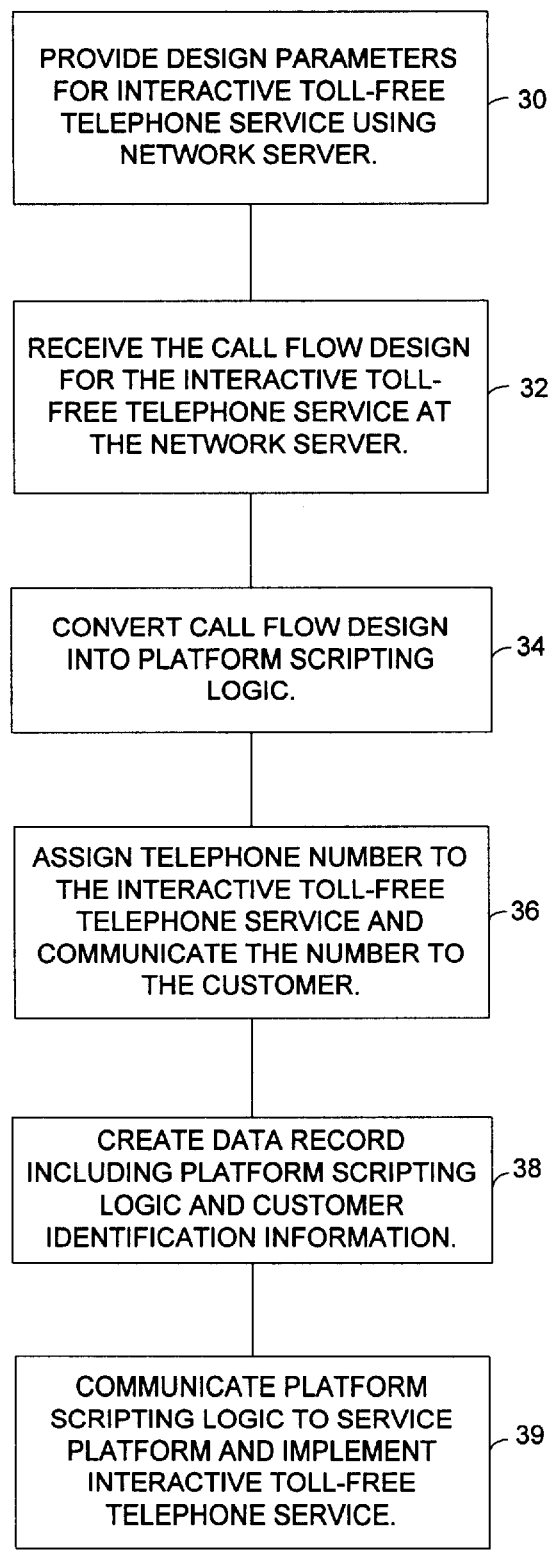
FIG. 2 is a flow diagram of another method for providing interactive toll-free telephone service through the Internet.

A more specific method according to the present invention is illustrated in FIG. 2 in which the first step 30 involves providing design parameters for interactive toll-free telephone service to a prospective customer using a network server operated by a telephone service provider via the Internet or a similar communication network. The design parameters are preferably communicated in an object oriented language such as HTML or any code programming language that can be easily communicated over, e.g., the Internet.

The customers would preferably be receiving the design parameters using "browsing" software or other suitable software in which they could design the call flow for an interactive toll-free telephone service without the assistance of a salesperson from the telephone service provider.

After the customer designs the call flow for the interactive toll-free telephone service, the next step 32 in the method is receipt of the interactive toll-free telephone service design by the network server. Preferably, the customer is also required to supply identification information along with the call flow design such as, e.g., name, address, telephone number, e-mail address, etc.

Upon receipt of the call flow design and accompanying customer identification information, the next step 34 in the depicted method involves conversion of the object oriented language used by the customer to design the call flow to platform scripting logic that is preferably capable of implementation on a service platform used by the telephone service provider.

After conversion of the call flow design into scripting logic, the method also preferably includes step 36, i.e., assigning a telephone number to the interactive toll-free telephone service and communicating that number to the customer via the network server. As discussed above, the telephone number may be accompanied by other information such as rates for the service as designed by the customer, contact information for a designated salesperson, etc.

The customer identification information and platform scripting logic are combined into a data record in step 38 of the method depicted in FIG. 2. That data record can then be retained for permanent implementation if desired by the customer previewing the interactive toll-free telephone service.

The method also involves the step 39 of implementing the interactive toll-free telephone service using the platform scripting logic. As discussed above, it may be preferred that the interactive toll-free telephone service be implemented on a preview basis only to allow the customer to test the call flow design before implementing the interactive toll-free telephone service on a permanent basis. The preview also allows the customer to revise the call flow design if the preview of an initial design for interactive toll-free telephone service indicates that improvements in call flow design would be advantageous.

The method depicted in FIG. 2 also preferably includes notification of a salesperson for the telephone service provider that a customer has accessed the system and set up an interactive toll-free telephone service preview. The notification will typically include the customer identification portion of the data record created above to allow the salesperson to contact the customer to address their concerns and assist them with implementing the interactive toll-free telephone service on a permanent basis.

Figure 3:
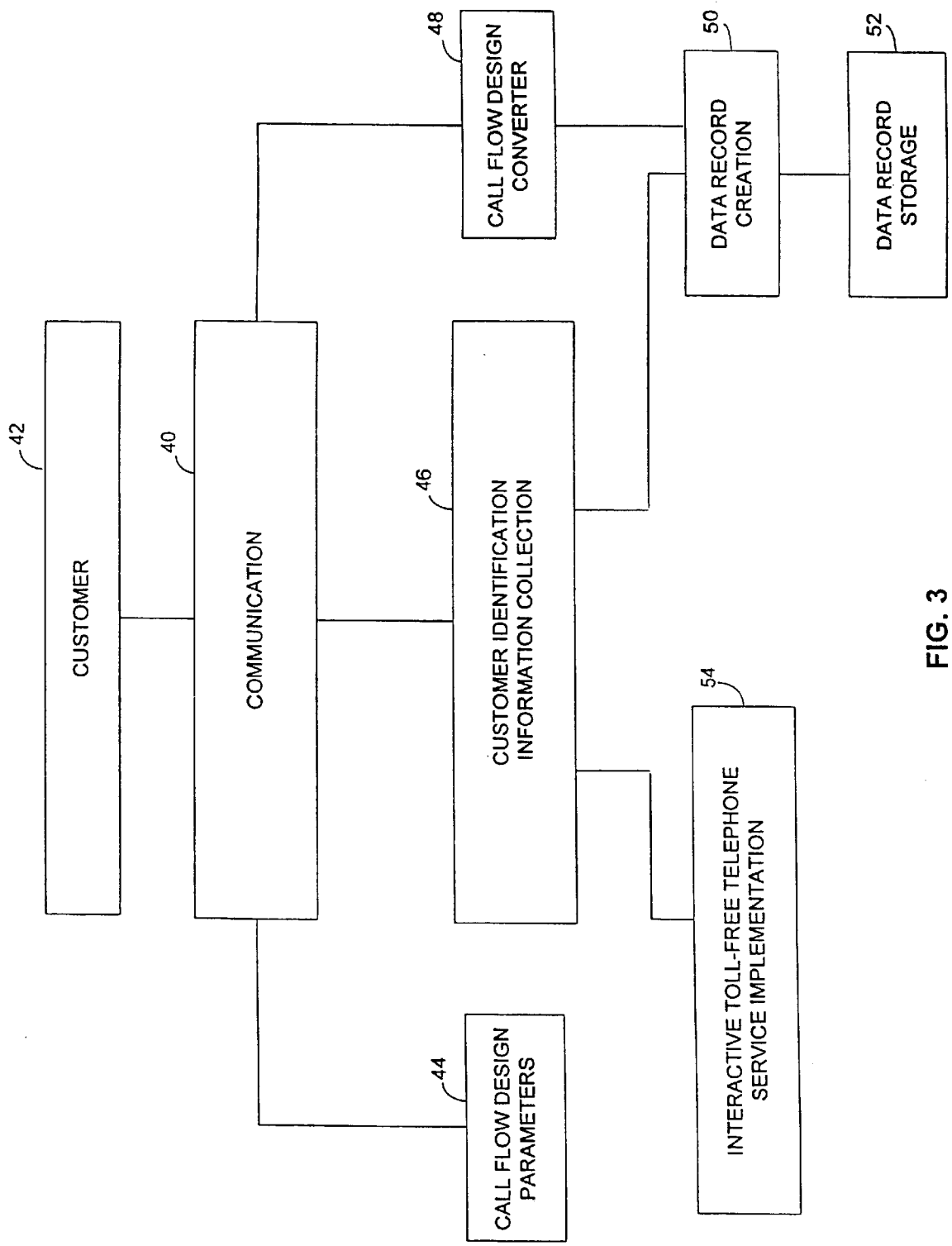
FIG. 3 is a schematic diagram of a system for providing interactive toll-free telephone service to customers.

FIG. 3 is a schematic diagram of one system for providing interactive toll-free telephone service to customers in accordance with the present invention. The system preferably includes means for communicating 40 with prospective customers 42 as well as with the rest of the system. In preferred systems, the means for communicating 40 will typically take the form of a network server such as those commonly used to communicate via the Internet. Alternatively or in addition to an Internet network server, the means for communicating 40 can take the form of an intranet network server for communicating with prospective customers 42 that have access to the network server of a closed network. In another variation, the means for communicating 40 can include a dial-up server designed to receive direct phone calls from customers 42 via a modem. In addition, those skilled in the art will recognize equivalents to those alternatives for the means for communicating specifically identified above.

For those prospective customers 42 connecting with the means for communicating 40, the connection will preferably be accomplished using a computer equipped with software capable of communicating using an object oriented programming language, e.g., HTML or an equivalent. Examples of suitable software include NAVIGATOR available from Netscape or INTERNET EXPLORER available from Microsoft Corporation. Both of those programs are capable of communicating via HTML through a network server. Alternatively, any other object oriented programming language or any code programming language that can be communicated to a server could be used in place of the preferred object oriented programming languages specifically described herein. Examples of suitable programming languages include, but are not limited to: BASIC, FORTRAN, COBOL, C+, C++, JAVA, etc.).

Regardless of the actual means for communicating 40 used, e.g., intranet, Internet, etc., the system preferably includes a means for providing call design flow parameters 44 to customers 42 via the means communicating 40. The means for providing the call design flow parameters 44 will preferably provide that information using object oriented programming language or any other suitable code programming language as described above. As a result, the customers 42 are able to design the call flow desired for the interactive toll-free telephone service in which they are interested.

The system also preferably includes means for collecting customer identification information 46 such as name, address, telephone number, e-mail address, etc. The collection of customer identification information also preferably is transmitted from the customers 42 via the means for communicating 40 described above.

Means for converting the call flow design 48 are also provided to convert the computer code used to design the interactive toll-free telephone service call flow by the customers 42 into platform scripting logic that can be implemented into interactive toll-free telephone service on a service platform by a telephone service provider. Examples of platform scripting logic may include, but are not limited to: BETEX, IAS (InterActive Scripting), C+, C++, COBOL, FORTRAN, BASIC, JAVA, etc. Alternatively, it may be possible in some instances to avoid the need for conversion of the call-flow design into platform scripting logic if the software used by the customer to design the call flow is, itself, capable of serving as the platform scripting logic.

The system depicted in FIG. 3 also preferably includes a means for creating a data record 50 that, in the preferred embodiments, includes the customer identification information and the platform scripting logic described above. In preferred systems, the means for communicating 40 may also be used to send the customer identification information portion of the data record to a salesperson for follow up. The system also preferably includes a means for storing the data record 52 that can take the form of any storage medium typically used for information.

Also forming a part of the system depicted in FIG. 3 is means for implementing interactive toll-free telephone service 54 with the call flow design provided by the customer 42 through the means for communicating 40 and converted into platform scripting logic by the means for converting the call flow design 54. As discussed above with respect to the methods of FIGS. 1 and 2, it will be understood that the means for implementing interactive toll-free telephone service 54 may implement the interactive toll-free telephone service on a temporary or preview basis or on a permanent basis.

Although the different means depicted in FIG. 3 and described above are separated, it will be understood that any system according to the present invention may combine one or more of the means for performing different functions in a manner other than that depicted. For example the means for creating the data record 50 and store the data record 52 may be combined in a single piece of e.g., hardware, software, or combination of hardware and software.

Figure 4:
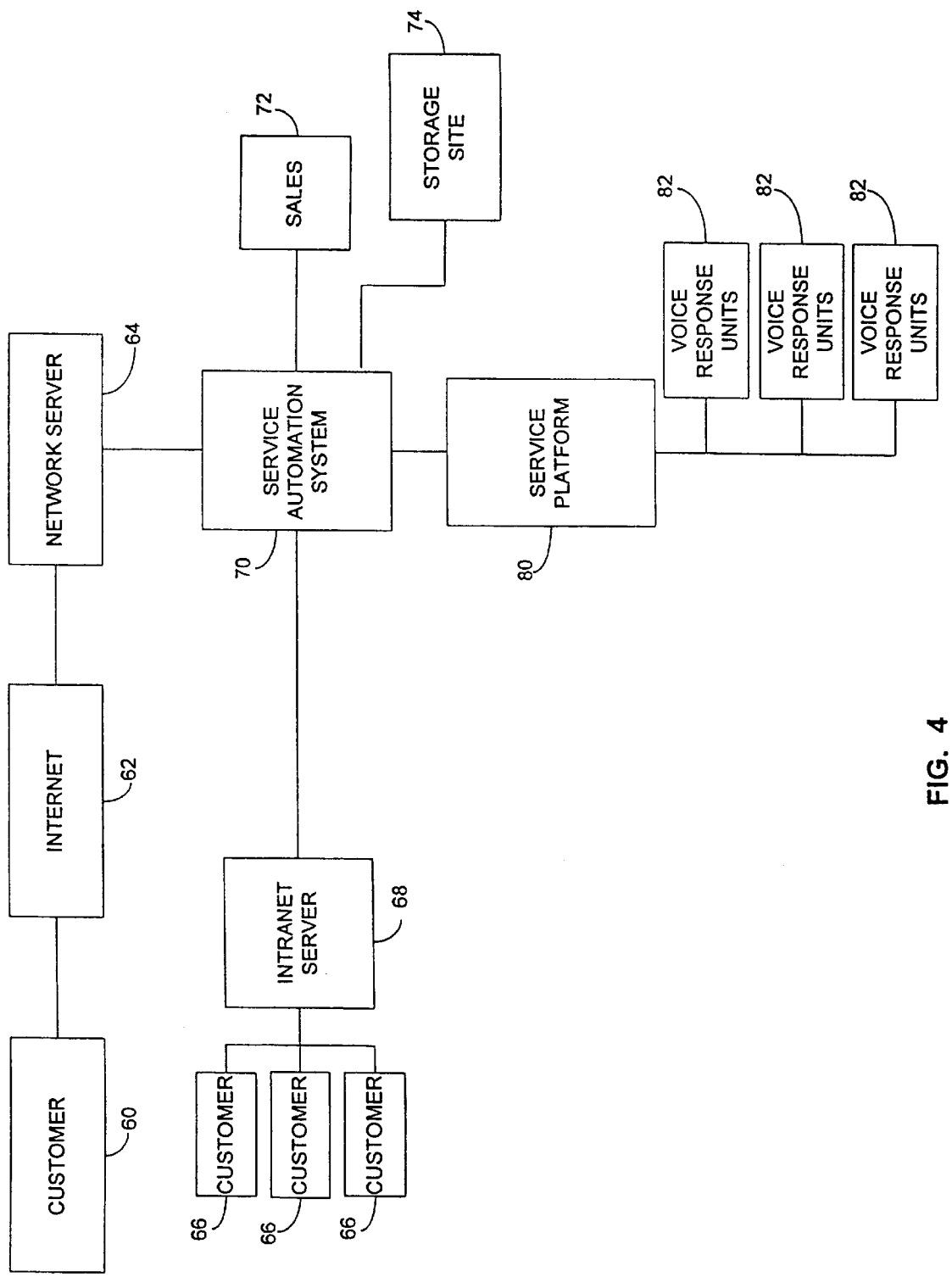
FIG. 4 is a schematic diagram of another system for providing interactive toll-free telephone service to customers.

FIG. 4 is a schematic diagram of another more specific system for providing interactive toll-free telephone service than that depicted in FIG. 3 and described above. The system depicted there includes a customer 60 connected to a network server 64 via the Internet 62. The network server 64 preferably provides the customer 60 with the call flow design parameters via, e.g., an object oriented programming language such as HTML. With that information, the customer 60 can design a desired call flow and submit it, along with customer identification information, to a service automation system 70.

Alternatively, the system may include customers 66 connected to an intranet server 68 that communicates with the service automation system 70. As with the Internet communication path, the customers 66 connected via the intranet server 68 preferably also use an object oriented programming language to design call flow for the desired interactive toll-free telephone service.

Regardless of the path used to reach the service automation system 70, a number of functions are performed in the preferred service automation system 70. Among those functions is to collect customer identification information from the customer 60/66 and use that information to form a part of a data record for the customer.

Another function of the service automation system 70 is to receive the call flow design prepared by the customer 60/66 in an object-oriented or other suitable programming language and convert it into platform scripting logic capable of implementation as an interactive toll-free telephone service. For example, the customer 60/66 may design the call flow in HTML and send it to the service automation system 70 via the Internet 62 and network server 64 where it is converted into any suitable platform scripting logic code for implementation. The platform scripting logic is also preferably used to form a part of the data record that also includes the customer identification information described above.

In addition to the above functions, the service automation system 70 also preferably assigns a telephone number to the customer 60/66. That number is communicated back to the customer 60/66 by any suitable method, e.g., through the path used by the customer to request the interactive toll-free telephone service, by electronic mail, etc. Also communicated with the telephone number may be other information such as rates for the service as designed by the customer, contact information for a designated salesperson, etc.

The service automation system 70 may also be used to assign a salesperson 72 to the customer and communicate customer identification information to that salesperson 72 for follow up regarding the interactive toll-free telephone service designed by the customer 60/66.

The data record formed by the service automation system 70 is also preferably communicated to a storage site 74 where both the customer identification information is retained along with the interactive toll-free telephone service call flow design provided by the customer. That call flow design may be stored in the object oriented programming code used by the customer 60/66, it could be stored in the platform scripting logic provided by the service automation system 70, or it could be stored as both.

After development of the platform scripting logic by the service automation system 70, the scripting logic is preferably provided to a service platform 80 for implementation as an interactive toll-free telephone service including, in the preferred systems, voice response units 82 for use by callers using the interactive toll-free telephone service.

In those systems in which the interactive toll-free telephone service is implemented only on a test basis, an additional advantage is provided in that the telephone numbers used for the interactive toll-free telephone services can be reused (preferably after an appropriate out-of-service interval). It would also be preferred that the service platform 80 used to implement the interactive toll-free telephone service include a dedicated trunk group for the test or preview interactive toll-free telephone services.

Although the illustrative methods and systems discussed above have focused on the use of remote computer-based access by customers, it should be understood that other methods of remote interactive access may also be used by customers to implement interactive toll-free telephone service in the methods and systems according to the present invention. One example of such an alternative is the use of interactive telephone services that preferably, but not necessarily, include voice recognition software/systems.

Figure 5:
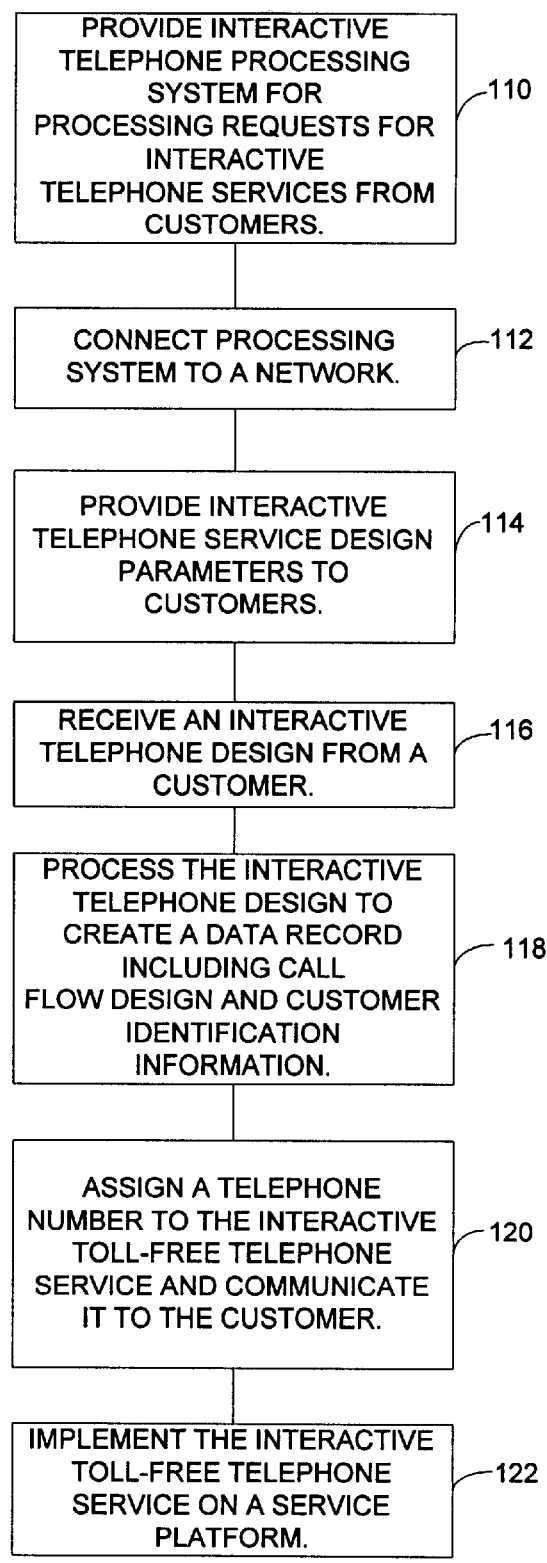
FIG. 5 is a flow diagram of another method for providing interactive toll-free telephone service.

One method using an interactive telephone service is depicted in FIG. 5.

One step 110 in the method depicted in FIG. 1 includes providing a processing system for receiving and processing requests for toll-free telephone service. The processing system is preferably an interactive telephone system capable of receiving commands from a customer either through voice recognition, from the keypad of the customer's telephone, or any equivalent method/system. In this method, the communication network used by the customers is the telephone system used by the customer to call the interactive telephone system.

After the processing system is provided, the method includes the step 112 of connecting the processing system to a telephone network so that customers can access the processing system by dialing the correct telephone number.

After the processing system is connected to the telephone network, the method involves the step 114 of providing interactive toll-free telephone service design parameters to customers calling the processing system. Those design parameters will typically include the structure within which the call flow can be varied as a part of the interactive toll-free telephone service. Examples of call flow include the desired response in the interactive toll-free service to the entry of input by a caller, such as routing the caller to a salesperson in response to an input of "1", routing the caller to a service department in response to an input of "2", routing the caller to a known extension number, etc. Although the design parameters could be provided solely through audible directions, it may be helpful to provide the customer with some additional information such as a brochure or directions that can be provided via the Internet, facsimile, mail, or any other suitable method.

As discussed above, the correct design of the call flow is of critical importance to the customer. In known systems, the call flow design for an interactive toll-free telephone service typically requires collaboration between the customer and a salesperson. In the present invention, however, the customer is provided with the tools to design the call flow for the interactive toll-free telephone service without the immediate assistance of a salesperson. By allowing the customer to design the call-flow, preferably in an object oriented programming language through, e.g., a graphical user interface, the telephone service provider can focus the efforts of its sales force on customers requiring assistance with more complex products and services. In addition, the customer can experiment more in the design of the call flow without the need for assistance of a salesperson.

After the customer has received the basic instructions for designing the interactive toll-free telephone service, the next step 116 in the method involves actual design of the interactive telephone service design from the customer using voice recognition, keypad commands, or any equivalent method. Typically, the customer will be requested to provide customer identification information such as a name, address, telephone number, e-mail address, etc. in addition to the call flow design.

After receiving the appropriate information from the customer, the next step 118 is to process the information to create a data record. A portion of the data record consists of the customer's identification information. Another portion of the data record includes the call flow design prepared by the customer. In the depicted method, step 118 includes conversion of the design provided by the customer into platform scripting logic that can be forwarded to a telephone services platform for actual implementation as a working interactive toll-free telephone service.

The next step 120 in the depicted method includes assigning a telephone number to the interactive toll-free telephone service to be provided and communicating the number back to the customer. In addition to the telephone number, the method may also include providing the customer with additional information, e.g., rates for the service as designed by the customer, contact information for a designated salesperson, etc.

Step 122 in the depicted method involves implementing the interactive toll-free free telephone service on a service platform using the platform scripting logic based on the customer's call flow design.

It should be understood that it may be possible to combine the functions of the steps discussed above in other combinations other than those depicted in FIG. 5 and described above. For example, it may be preferable that steps 114 and 116 of providing design parameters and receiving call-flow design information from the customer be repeated as the customer steps through the call-flow design process before step 118 of converting the call flow design into suitable platform scripting logic or assigning a telephone number are performed.

Figure 6:
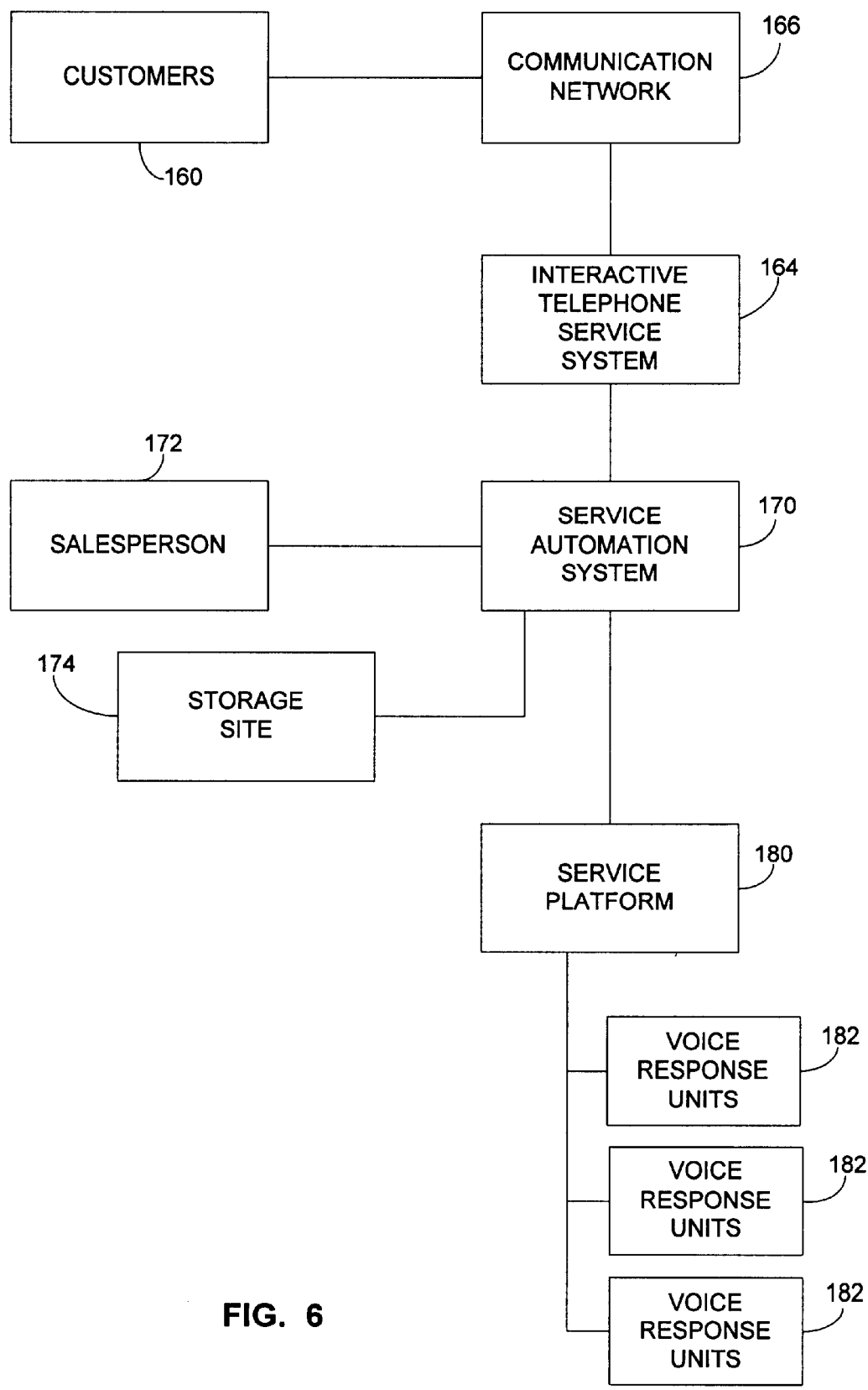
FIG. 6 is a schematic diagram of another system for providing interactive toll-free telephone service to customers.

FIG. 6 is a schematic diagram of another system for providing interactive toll-free telephone service in which the customers 160 contact an interactive telephone service system 164 through a communication network 166 that is the telephone system.

The interactive telephone service system 164 preferably provides the customer 160 with the call flow design parameters, although those parameters could be provided separately by brochures, electronic mail, Internet, facsimile, etc. With that information, the customer 160 can interactively design a desired call flow and submit it, along with customer identification information, to a service automation system 170. For example, the customer may input information into the interactive telephone service system 164 using voice recognition software/hardware, telephone keypad input, combinations of the above, or any other suitable/equivalent systems. Typically, the interactive telephone service system 164 will provide information to the customer 160, who will then input information into the interactive telephone service system 164. These steps may be repeated a number of times until the call flow design is complete and the required customer information has been collected.

Once the customer 160 has completed the call flow design process, the information collected by the interactive telephone service system 164 is provided to the service automation system 170. The call flow design provided by the customer 160 is converted into platform scripting logic capable of implementation as an interactive toll-free telephone service by the service automation system 170. The platform scripting logic is also preferably used to form a part of a data record that also includes the customer identification information.

In addition to the above functions, the service automation system 170 also preferably assigns a telephone number to the customer 160. That number is communicated back to the customer 160 by any suitable method, e.g., through the path used by the customer to request the interactive toll-free telephone service, by electronic mail, etc. Also communicated with the telephone number may be other information such as rates for the service as designed by the customer, contact information for a designated salesperson, etc.

The service automation system 170 may also be used to assign a salesperson 172 to the customer and communicate customer identification information to that salesperson 172 for follow up regarding the interactive toll-free telephone service designed by the customer 160.

The data record including the customer identification information and the interactive toll-free telephone service call flow design provided by the customer is also preferably communicated to a storage site 174 by the service automation system 170 where the data record is stored for later retrieval. The data record may be stored in form received by the interactive telephone service system 164, as converted by the service automation system 170, or it could be stored as both.

After development of the platform scripting logic by the service automation system 170, the scripting logic is preferably provided to a service platform 180 for implementation as an interactive toll-free telephone service including, in the preferred systems, voice response units 182 for use by callers using the interactive toll-free telephone service.

As described above, the present invention relies on communication between the customer and a system that preferably provides the call flow design parameters for the interactive toll-free telephone service. That communication can take place via any communication medium. For example, it may be digital or analog. It may be accomplished using a modem or via a direct digital connection. It may be performed using electrical lines (telephone or otherwise), satellites, infrared, microwave, or any suitable means or methods. Finally, the communication can take place via any combination of the above or other communication systems.

Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof.

What is claimed is:

1. A method for providing interactive toll-free telephone service comprising the steps of:
   providing a service automation system for processing requests for interactive toll-free telephone service;
   connecting the service automation system to a communication network whereby a request for interactive toll-free telephone service can be communicated to the service automation system by a customer;
   providing design parameters for designing an interactive toll-free telephone service to the customer, whereby the customer can design an interactive toll-free telephone service without knowledge of a code programming language from a remote customer-specific location;
   receiving an interactive toll-free telephone service design from the customer through the communication network; and
   implementing the interactive toll-free telephone service with a call flow based on the interactive toll-free telephone service design from the customer.

2. A method according to claim 1, wherein the communication network comprises a computer network.

3. A method according to claim 2, wherein the computer network comprises an intranet.

4. A method according to claim 2, wherein the computer network comprises the Internet.

5. A method according to claim 1, wherein the communication network comprises a telephone network.

6. A method according to claim 1, further comprising converting the interactive toll-free telephone service design received from the customer into platform scripting logic.

7. A method according to claim 6, further comprising communicating the platform scripting logic to a telephone service platform, whereby the interactive toll-free telephone service can be implemented.

8. A method according to claim 1, wherein the step of implementing the interactive toll-free telephone service comprises implementing the interactive toll-free telephone service for a limited period of time.

9. A method according to claim 1, further comprising storing the interactive toll-free telephone service design.

10. A method according to claim 1, further comprising receiving customer identification information from the customer.

11. A method according to claim 1, further comprising communicating a telephone number for the interactive toll-free telephone service to the customer.

12. A method for providing interactive toll-free telephone service comprising the steps of:
   providing a service automation system for processing requests for interactive toll-free telephone service;
   connecting the service automation system to a communication network whereby a request for interactive toll-free telephone service can be communicated to the service automation system by a customer, wherein the communication network comprises the Internet; providing design parameters for designing an interactive toll-free telephone service to the customer, whereby the customer can design an interactive toll-free telephone service without knowledge of a code programming language from a remote customer-specific location;
   receiving an interactive toll-free telephone service design from the customer through the communication network;
   converting the interactive toll-free telephone service design received from the customer into platform scripting logic;
   communicating the platform scripting logic to a telephone service platform;
   implementing the interactive toll-free telephone service for a limited period of time with a call flow based on the interactive toll-free telephone service design from the customer; and
   communicating a telephone number for the interactive toll-free telephone service to the customer.

13. A system for providing interactive toll-free telephone service comprising:
   a service automation system for processing requests for interactive toll-free telephone service;
   means for connecting the service automation system to a communication network whereby a request for interactive toll-free telephone service can be communicated to the service automation system by a customer;
   means for providing design parameters for designing an interactive toll-free telephone service to the customer, whereby the customer can design an interactive toll-free telephone service without knowledge of a code programming language from a remote customer-specific location;
   means for receiving an interactive toll-free telephone service design from the customer through the communication network;
   means for implementing the interactive toll-free telephone service on a telephone service platform with a call flow based on the interactive toll-free telephone service design from the customer.

14. A system according to claim 13, wherein the communication network comprises a computer network.

15. A system according to claim 14, wherein the computer network comprises an intranet.

16. A system according to claim 14, wherein the computer network comprises the Internet.

17. A system according to claim 13, wherein the communication network comprises a telephone network.

18. A system according to claim 13, further comprising means for converting the interactive toll-free telephone service design received from the customer into platform scripting logic.

19. A system according to claim 18, further comprising means for communication the platform scripting logic to the telephone service platform, whereby the interactive tool-free telephone service can be implemented.

20. A system according to claim 13, further comprising means for storing the interactive toll-free telephone service design.

21. A method according to claim 1, wherein the customer can design the interactive toll-free telephone service using an object-oriented programming language.

22. A method according to claim 21, wherein the object-oriented programming language is HTML.

23. A method according to claim 5, wherein the customer can design the interactive toll-free telephone service using a voice recognition system.

24. A method according to claim 5, wherein the customer can design the interactive toll-free telephone service using telephone keypad commands.

25. A method according to claim 12, wherein the customer can design the interactive toll-free telephone service using an object-oriented programming language.

26. A method according to claim 25, wherein the object-oriented programming language is HTML.

27. A method according to claim 13, wherein the customer can design the interactive toll-free telephone service using an object-oriented programming language.

28. A method according to claim 27, wherein the object-oriented programming language is HTML.

29. A method according to claim 17, wherein the customer can design the interactive toll-free telephone service using a voice recognition system.

30. A method according to claim 17, wherein the customer can design the interactive toll-free telephone service using telephone keypad commands.

31. A method for providing interactive toll-free telephone service comprising the steps of:

provising a service automation system for processing requests for interactive toll-free telephone service;

connecting the service automation system to a communication network whereby a request for interactive toll-free telephone service can be communicated to the service automation system by a customer;

providing design parameters for designing an interactive toll-free telephone service to the customer, whereby the customer can design the interactive toll-free telephone service without the assistance of a salesperson;

receiving the interactive toll-free telephone service design and customer identification information from the customer through the communication network;

creating a data record comprising the interactive toll-free telephone service design and customer identification information;

converting the interactive toll-free telephone service design received from the customer into platform scripting logic;

communicating the platform scripting logic to a telephone service platform;

implementing the interactive toll-free telephone service for a limited period of time on the telephone service platform with a call flow based on the interactive toll-free telephone service design from the customer;

communicating a telephone number for the interactive toll-free telephone service to the customer, whereby the customer can test the interactive toll-free telephone service without the assistance of a salesperson; and retaining the data record after the limited period of time for later implementation of the interactive toll-free telephone service on a permanent basis if desired by the customer.

32. A method according to claim 31, wherein the customer can design the interactive toll-free telephone service without knowledge of a code programming language from a remote customer-specific location.

33. A method according to claim 31, wherein the customer can design the interactive toll-free telephone service using an object-oriented programming language.

34. A method according to claim 32, wherein the object-oriented programming language is HTML.

35. A method according to claim 31, wherein the communication network comprises a computer network.

36. A method according to claim 34, wherein the computer network comprises an intranet.

37. A method according to claim 34, wherein the computer network comprises the Internet.

38. A method according to claim 31, wherein the communication network comprises a telephone network.

39. A method according to claim 37, wherein the customer can design the interactive toll-free telephone service using a voice recognition system.

40. A method according to claim 37, wherein the customer can design the interactive toll-free telephone service using telephone keypad commands.

* * * * *

UNITED STATES PATENT AND TRADEMARK OFFICE
CERTIFICATE OF CORRECTION

PATENT NO. : 6,272,115 B1  Page 1 of 1
DATED : August 7, 2001
INVENTOR(S) : Emmett Marion Elliott, III It is certified that error appears in the above-identified patent and that said Letters Patent is hereby corrected as shown below:

Column 10,
Line 7, delete "free" between "toll-free" and telephone".

Column 13,
Line 10, delete "communication" and insert -- communicating -- therefor.
Line 11, delete "tool-free" and insert -- toll-free -- therefor.

Signed and Sealed this

Twelfth Day of March, 2002

Attest:

JAMES E. ROGAN
*Director of the United States Patent and Trademark Office*

*Attesting Officer*